(12) United States Patent
Tanimoto

(10) Patent No.: US 6,798,274 B2
(45) Date of Patent: Sep. 28, 2004

(54) BOOSTER AND IMAGING DEVICE USING BOOSTER

(75) Inventor: Takashi Tanimoto, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/400,754

(22) Filed: Mar. 27, 2003

(65) Prior Publication Data

US 2003/0184361 A1 Oct. 2, 2003

(30) Foreign Application Priority Data

Mar. 27, 2002 (JP) .......................................... 2002-088325

(51) Int. Cl.$^7$ .............................................. G05F 1/10
(52) U.S. Cl. ...................................................... 327/536
(58) Field of Search ................................ 327/530, 534, 327/535, 536, 537

(56) References Cited

U.S. PATENT DOCUMENTS 6,297,687 B1 * 10/2001 Sugimura .................... 327/536
6,424,203 B1 * 7/2002 Bayadroun .................. 327/536

\* cited by examiner

*Primary Examiner*—Jeffrey Zweizig
(74) *Attorney, Agent, or Firm*—Fish & Richardson P.C.

(57) ABSTRACT

A booster for generating stable boosted voltage with respect to fluctuation of power supply voltage and load current. The booster has a charge pump circuit including a plurality of boosting units connected in series to selectively validate the boosting units and generate the boosted voltage in accordance with the number of validated boosting units. A boost control circuit is connected to the charge pump circuit to determine whether the boosted voltage is in a predetermined range and change the number of validated boosting units in accordance with the determination.

12 Claims, 5 Drawing Sheets

BOOSTER AND IMAGING DEVICE USING BOOSTER

CROSS-REFERENCE TO RELATED APPLICATIONS

This application is based upon and claims the benefit of priority from the prior Japanese Patent Application No. 2002-088325, filed on Mar. 27, 2002, the entire contents of which are incorporated herein by reference.

BACKGROUND OF THE INVENTION

The present invention relates to a booster for boosting an input voltage to generate a boosted voltage and to an imaging device provided with a booster.

In electronic equipment that requires different voltages, boosting circuits or regulating circuits are used to obtain multiple voltages from the same power supply. FIG. 1 is a schematic block diagram illustrating part of the configuration of an imaging device 50 in such electronic equipment.

The imaging device 50 includes a boosting circuit 1, a regulating circuit 2, a CCD driver circuit 3, and a CCD image sensor 4. The boosting circuit 1 boosts a power supply voltage VD, which is received by its input terminal, to generate a boosted voltage VO1 and outputs the boosted voltage VO1. The boosting circuit 1 includes, for example, a charge pump circuit, which has a plurality of transistors connected in series between the input terminal and an output terminal, and a capacitor, which has a terminal connected to a node between adjacent transistors.

The regulating circuit 2 receives the boosted voltage VO1 from the boosting circuit 1 to generate a predetermined adjusted voltage VO2. The regulating circuit 2 resistor-divides the boosted voltage VO1 to generate a divisional voltage and compares the divisional voltage with a predetermined reference voltage VR. The regulating circuit 2 controls the adjusted voltage output in accordance with the result of the comparison. In the regulating circuit 2, the voltage value of the adjusted voltage is set in accordance with the operational voltage of the CCD driver circuit 3 in the next stage. The regulating circuit 2 decreases the boosted voltage VO1 to the operational voltage of the CCD driver circuit 3 to generate a suitably adjusted voltage VO2.

The CCD driver circuit 3 receives the adjusted voltage VO2 and generates clock pulses, which are in synchronism with a vertical synchronizing signal VT and a horizontal synchronizing signal HT, which are provided from a timing control circuit (not shown). The generated clock pulses are provided to the CCD image sensor 4.

The CCD image sensor 4 has a light-receiving section, which includes a matrix of light-receiving pixels. The CCD image sensor 4 receives the light entering the light-receiving section with each light-receiving pixel and performs photoelectric conversion to generate information charges. The CCD image sensor 4 stores the information charges in each light-receiving pixel for a predetermined storage time. Then, the CCD image sensor 4 sequentially transfers the information charges in accordance with the clock pulses from the CCD driver circuit 3. An output section, which is located in the final stage of a transfer route, converts the information charges to a voltage value to generate an image signal Y(t). The image signal Y(t) undergoes a predetermined signal process in an analog signal processing circuit and a digital signal processing circuit (not shown), which are in the following stage, to provide a storage medium or a display device with data representing image information.

The boosted voltage VO1 of the boosting circuit 1 depends on the power supply voltage VD and fluctuates in accordance with the fluctuation of the power supply voltage VD. Thus, if the power supply voltage VD decreases unexpectedly for one reason or another, the boosted voltage VO1 also follows the decrease in the power supply voltage VD and decreases. Accordingly, the CCD driver circuit 3 may not be supplied with the required operational voltage. In such a case, there may be a problem in the imaging operation of the imaging device 50.

Further, the boosted voltage VO1 is dependent on fluctuation of the current flowing through a load, which is operated by the boosted voltage VO1. Thus, when a large amount of current is consumed in the load, the boosted voltage VO1 changes in accordance with the large current consumption. In such a case, it may be difficult to guarantee suitable operational voltage output for the CCD driver circuit 3.

SUMMARY OF THE INVENTION

One aspect of the present invention is a booster for receiving a power supply voltage and generating a boosted voltage. The booster includes a charge pump circuit including a plurality of boosting units connected in series and selectively validating the boosting units to generate the boosted voltage in accordance with the number of validated boosting units. A boost control circuit is connected to the charge pump circuit to determine whether the boosted voltage is in a predetermined range and change the number of validated boosting units in accordance with the determination.

A further aspect of the present invention is a method for controlling a charge pump circuit including a plurality of boosting units that are connected in series. The boosting units are selectively validated to generate the boosted voltage in accordance with the number of validated boosting units. The method includes generating a divisional voltage by dividing the boosted voltage, determining whether the divisional voltage is in a predetermined range, and changing the number of boosting units that are validated in accordance with the determination.

A further aspect of the present invention is an imaging device including a solid state imaging device having a plurality of light receiving pixels for storing information charges and a charge pump circuit including a plurality of boosting units connected in series for selectively validating the boosting units to generate a boosted voltage in accordance with the number of validated boosting units. A boost control circuit is connected to the charge pump circuit to determine whether the boosted voltage is in a predetermined range and change the number of validated boosting units in accordance with the determination. A regulating circuit is connected to the charge pump circuit to generate a predetermined adjusted voltage in accordance with the boosted voltage and a reference voltage. A drive circuit is connected to the regulating circuit to drive the solid state imaging device. The drive circuit is operated in accordance with the adjusted voltage for driving the solid state imaging device to obtain an image signal from the information charges.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
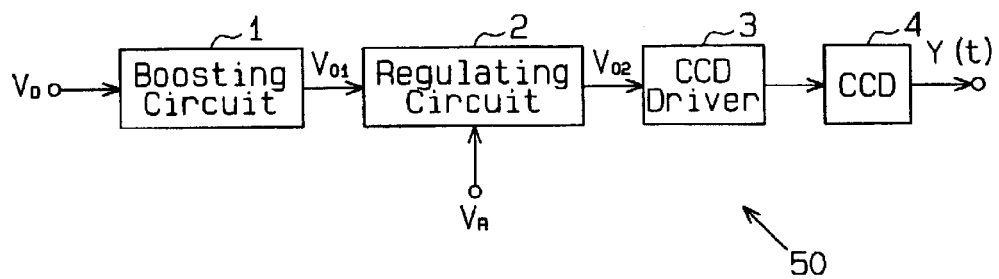
FIG. 1 is a schematic block diagram of an imaging device incorporating a prior art boosting circuit.

In the drawings, like numerals are used for like elements throughout.

Figure 2:
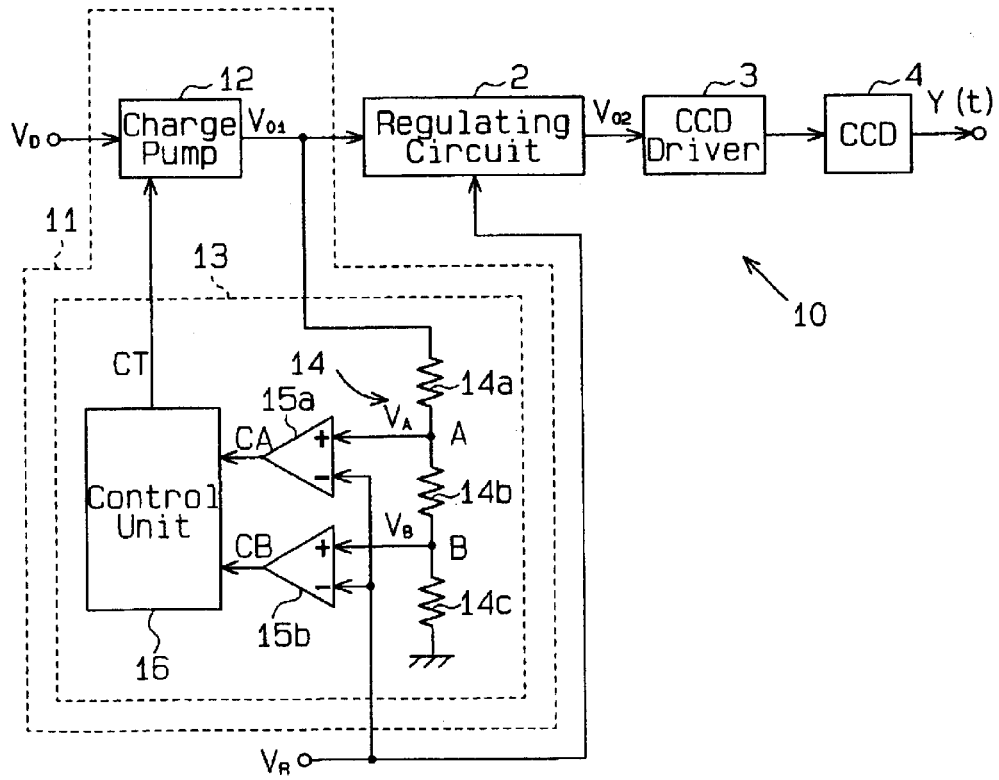
FIG. 2 is a schematic block diagram of an imaging device including a booster according to a preferred embodiment of the present invention.

FIG. 2 is a schematic block diagram of an imaging device 10 including a booster 11 according to a preferred embodiment of the present invention. The booster 11 of the present invention includes a charge pump circuit 12 and a boost control circuit 13. The imaging device 10 includes the booster 11, the regulating circuit 2, a CCD driver circuit 3, and a CCD image sensor 4. In the preferred embodiment, "boosted voltage" includes voltage that is boosted toward a negative voltage.

A feature of the booster 11 is that divisional voltages VA and VB are compared with the boosted voltage VO1 of the charge pump circuit 12. Further, in accordance with the comparison result, a plurality of (two in the preferred embodiment) boosting units BU1 and BU2 are selectively driven. In other words, the boosting operation of the charge pump circuit 12 is feedback controlled.

The charge pump circuit 12 boosts a power supply voltage VD, which is supplied to its input terminal, to generate a boosted voltage. The charge pump circuit 12 includes the two boosting units BU1 and BU2, which are connected in series between the input terminal and an output terminal and which are selectively driven. The boosting rate is varied in accordance with the number of the boosting units that are selectively driven.

Referring to FIG. 2, the booster voltage control circuit 13 is connected to the charge pump circuit 12 and includes a voltage dividing circuit 14, first and second comparators 15a and 15b, and a control unit 16. The voltage dividing circuit 14 includes first, second, and third resistors 14a, 14b, and 14c, which are connected in series between the output side of the charge pump circuit 12 and the ground VS (e.g., 0V). A first divisional voltage VA and a second divisional voltage VB, which is lower than the first divisional voltage VA, are respectively generated at nodes A and B between the resistors 14a to 14c.

The first comparator 15a includes a non-inverting input terminal, which receives a first divisional voltage VA and which is connected to node A, and an inverting input terminal, which receives a reference voltage VR. The first comparator 15a compares the first divisional voltage VA with the reference voltage VR and generates a first comparison output CA in accordance with the potential difference between the voltages.

The second comparator 15b includes a non-inverting input terminal, which receives a second divisional voltage VB and which is connected to node B, and an inverting input terminal, which receives the reference voltage VR. The second comparator 15b compares the second divisional voltage VB with the reference voltage VR and generates a second comparison output CB in accordance with the potential difference between the voltages.

The control unit 16 receives the first and second comparison outputs CA and CB and generates a boosted voltage control signal CT to switch the number of validated boosting units in the charge pump circuit 12. The boosted voltage control signal CT is high when, for example, instructing the charge pump circuit 12 to validate one boosting unit to obtain a first boosting rate. The boosted voltage control signal CT is low when, for example, instructing the charge pump circuit 12 to validate two boosting units to obtain a second boosting rate.

Figure 3:
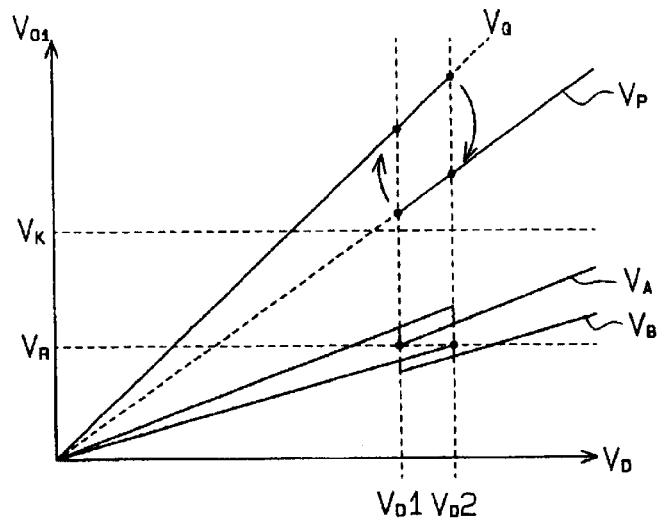
FIG. 3 is a chart illustrating the relationship between the boosted voltage and power supply voltage of a charge pump circuit in the booster of FIG. 2.

The operation of the booster 11 will now be discussed. FIG. 3 is a graph illustrating the relationship between the boosted voltage (output voltage) VO1 and power supply voltage VD of the charge pump circuit 12.

The voltages shown in FIG. 3 will now be discussed. Voltage VK is the operational voltage of the regulating circuit 2, which is required to generate the required adjusted voltage for the regulating circuit 2. Voltage VP (hereafter, referred to as first boosted voltage) is the boosted voltage of the charge pump circuit 12 at the first boosting rate. Voltage VQ (hereafter, referred to as second boosted voltage) is the boosted voltage of the charge pump circuit 12 at the second boosting rate.

When supplied with power, the charge pump circuit 12 is driven at the second boosting rate, which is greater than the first boosting rate, to quickly increase the boosted voltage VO1. Thus, the second boosted voltage VQ and the first and second divisional voltages VA and VB are increased in accordance with the increase in the power supply voltage VD. As the second divisional voltage VB reaches the reference voltage VR when the power supply voltage VD is increasing, the number of validated boosting units in the charge pump circuit 12 is decreased to shift to the first boosting rate. In other words, as the power supply voltage VD increases to a certain level, the boosting rate is shifted to the lower first boosting rate to decrease power consumption. Subsequently, the charge pump circuit 12 operates at the first boosting rate and generates the first boosted voltage when the power supply voltage VD is stable.

An example in which the power supply voltage VD decreases will now be discussed. When the power supply voltage VD decreases due to one reason or another, the first boosted voltage VP decreases in accordance with the decrease of the power supply voltage VD. Further, the first and second divisional voltages VA and VB decrease in accordance with the decrease of the first boosted voltage VP. When the first divisional voltage VA decreases to the reference voltage VR, the control unit 16 increases the validated number of boosting units in the charge pump circuit 12 to shift to the second boosting rate. This shifts the first boosted voltage VP to the second boosted voltage VQ and guarantees sufficient margin for the voltage VK.

Then, when the power supply voltage VD stops decreasing and the power supply voltage VD starts increasing again, if the divisional voltage VB reaches the reference voltage VR, the control unit 16 decreases the validated number of boosting units in the charge pump circuit 12 and shifts again to the first boosting rate. Even if the boosted voltage VO1 decreases due to changes in the current flowing through an output load (e.g., CCD driver circuit) of the charge pump circuit 12, the control unit 16 controls the charge pump circuit 12 in the same manner as when a decrease in the power supply voltage VD decreases the boosted voltage VO1.

Due to the charge pump circuit 12, which selectively validates a plurality of boosting units, and the boost control circuit 13, which switches the validated number of boosting units in the charge pump circuit according to whether or not the boosted voltage VO1 of the charge pump circuit 12 is in a predetermined range, the boosting capacity of the charge pump circuit 12 is changed in accordance with a decrease in the output voltage of the charge pump circuit 12 resulting from the fluctuation of the power supply voltage VD and the change in the output load current. This stabilizes the boosted voltage VO1 and increases reliability.

In the present invention, the two divisional voltages VA and VB are used when comparing the boosted voltage VO1 and the reference voltage VR to switch the divisional voltage, which is compared with the reference voltage VR, when the power supply voltage VD falls or rises. This prevents the boosting rate of the charge pump circuit 12 from being frequently switched even when the power supply voltage VD repeatedly fluctuates near the voltage VD1 or VD2.

Figure 4:
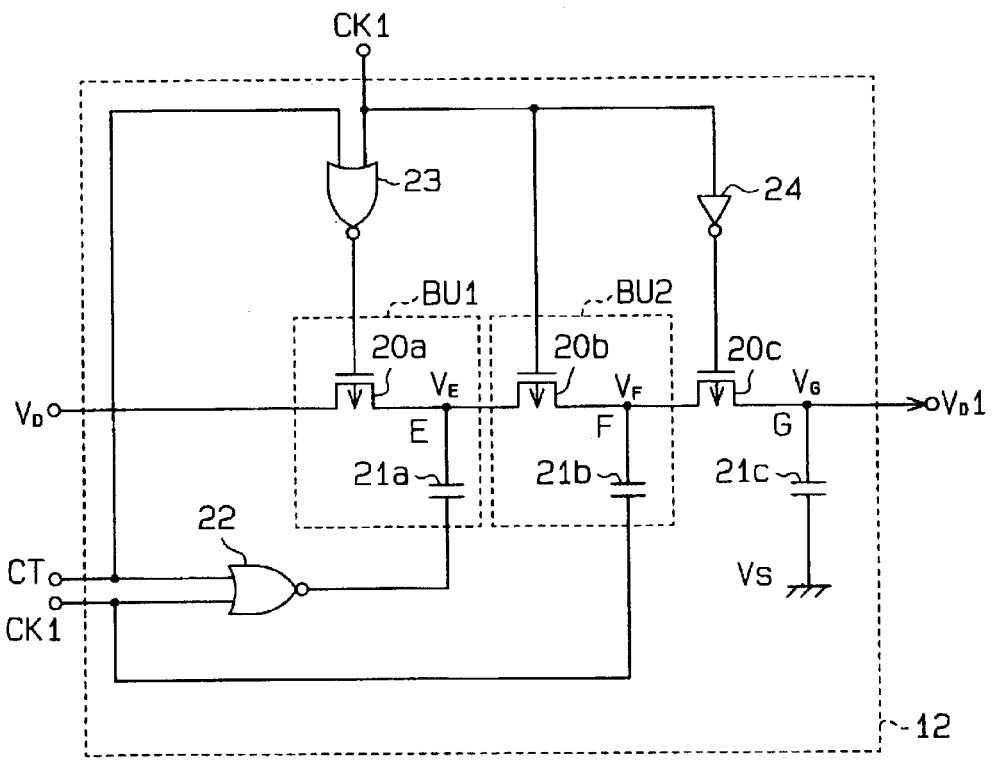
FIG. 4 is a circuit diagram of a charge pump circuit in the booster of FIG. 2.

The charge pump circuit 12 will now be discussed in detail. FIG. 4 is a schematic block diagram of the charge pump circuit 12. The charge pump circuit 12 includes transistors 20a to 20c, capacitors 21a to 21c, NOR gates 22 and 23, and an inverter 24. The transistor 20a and the capacitor 21a configure the first boosting unit BU1, and the transistor 20b and the capacitor 21b configure the second boosting unit BU2. The transistors 20 to 20c are preferably p-channel MOS transistors and are connected in series between a power supply terminal (VD) and an output terminal (VO1).

The capacitor 21a has a first terminal, which is connected to node E between the transistors 20a and 20b, and a second terminal, which is connected to the output terminal of the NOR gate 22. The capacitor 21b has a first terminal, which is connected to node F between the transistors 20b and 20c, and a second terminal, which receives a first clock signal CK1. The first clock signal CK1 oscillates between a high level (power supply voltage VD) and a low level (ground voltage Vs).

The capacitor 21c has a first terminal, which is connected to node G between the transistor 20c and the output terminal (VO1), and a second terminal, which is connected to the ground voltage Vs.

The NOR gate 22 has a first input terminal, which receives the boosted voltage controlling signal CT, and a second input terminal, which receives the first clock signal CK1. The NOR gate 23 has a first input terminal, which receives the boosted voltage controlling signal CT, and a second input terminal, which receives the first clock signal CK1. The output terminal of the NOR gate 23 is connected to the gate of the transistor 20a. The inverter 24 has an input terminal, which receives the clock signal, and an output terminal, which is connected to the gate of the transistor 20c.

Figure 5:
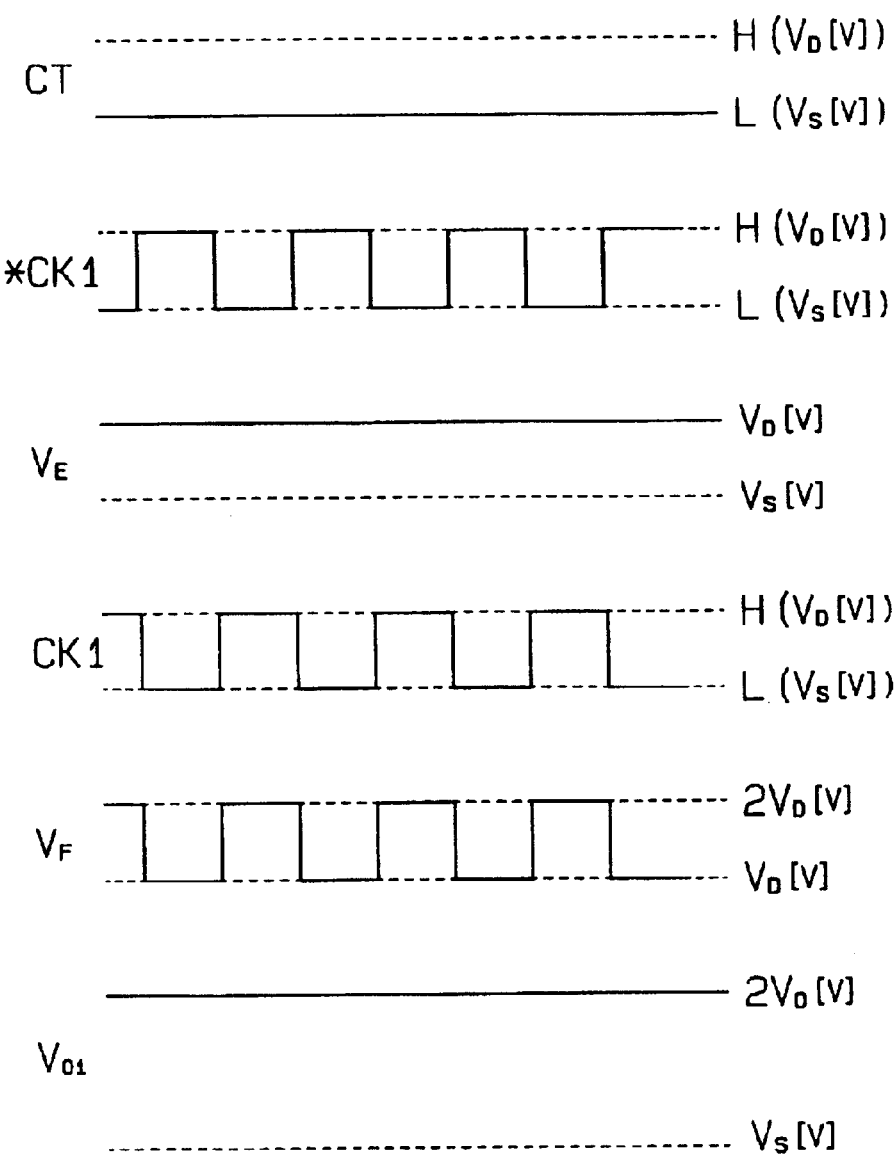
FIG. 5 and FIG. 6 are timing charts illustrating the operation of the charge pump circuit of FIG. 4.

The operation of the charge pump circuit 12 will now be discussed. FIG. 5 is a timing chart illustrating the operation of the charge pump circuit 12 at the first boosting rate (hereafter, referred to as the first mode). The second boosting unit BU2 is used only in the first mode.

In the first mode of the charge pump circuit 12, the boost control circuit 13 provides the first input terminals of the NOR gates 22 and 23 with the boosted voltage control signal CT at a high level (e.g., power supply voltage VD). Thus, regardless of the level of the first clock signal CK1, the output voltage of the NOR gates 22 and 23 has a low level (e.g., ground voltage Vs) regardless of the first clock signal CK1. In this state, the voltage at the second terminal of the capacitor 21a is fixed at the ground voltage Vs, and the transistor 20a is validated. As a result, the voltage VE at node E is fixed at the power supply voltage VD. More specifically, in the first mode, the first boosted voltage unit, which is configured by the transistor 20a and the capacitor 21a, is invalidated. Then, the power supply voltage VD is applied to the transistor 20b.

In this state, the first clock signal CK1 is provided to the second terminal of the capacitor 21b and the gate of the transistor 20b. This validates the transistor 20b when the first clock signal CK1 is low and invalidates the transistor 20b when the first clock signal CK1 is high. The gate of the transistor 20c receives the first clock signal CK1 and a second clock signal *CK1, the phase of which is reversed from that of the first clock signal CK1. The transistor 20c is invalidated when the second clock signal *CK1 is high and validated when the second clock signal *CK1 is low. Thus, in accordance with the change in the level of the first clock signal CK1, the voltage VF at node F oscillates between the power supply voltage VD and two times (2×) the power supply voltage, i.e., 2VD. As a result, the boosted voltage VO1 is generated at the 2× power supply voltage, i.e., 2VD.

Figure 6:
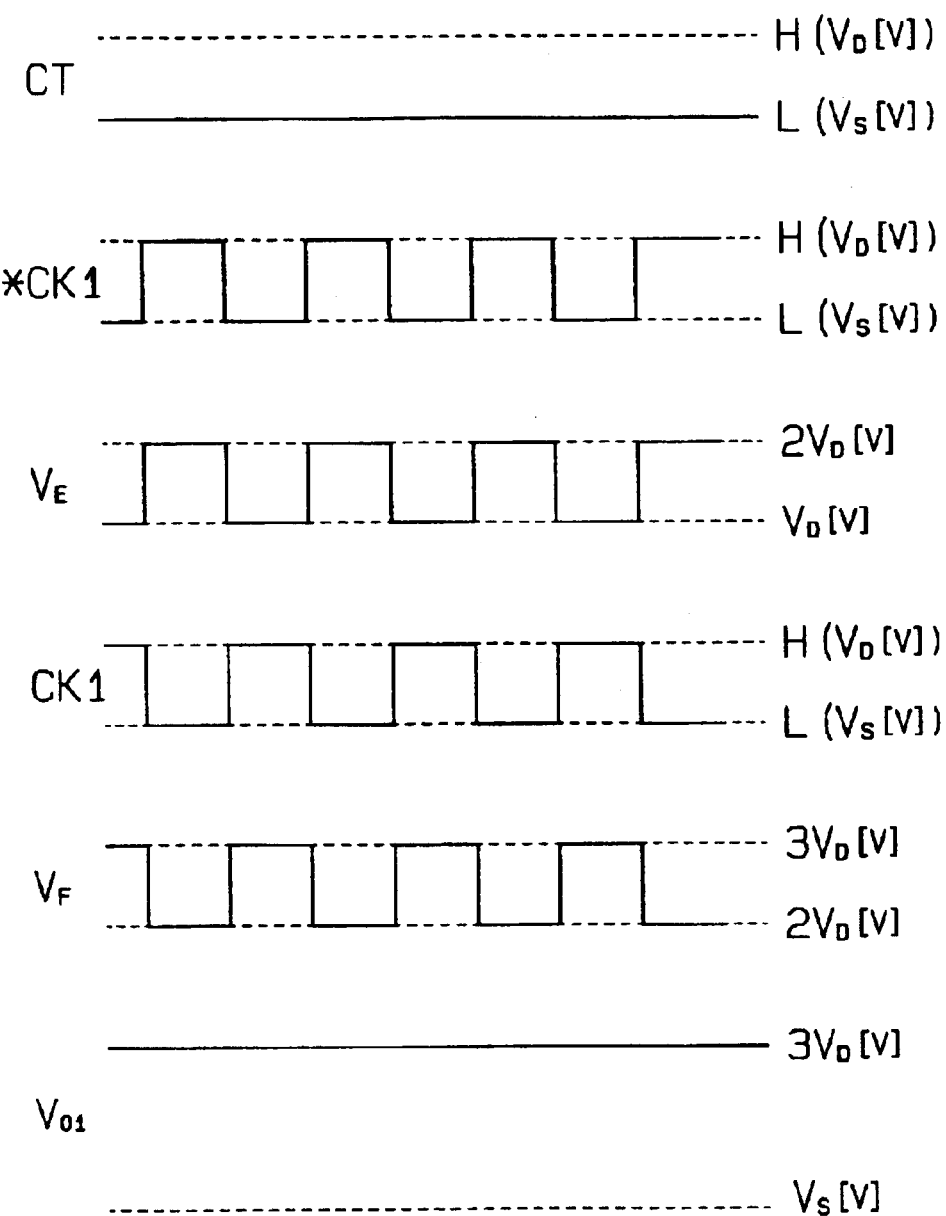

FIG. 6 is a timing chart illustrating the operation of the charge pump circuit 12 at the second boosting rate (hereafter, referred to as second mode). The first and second boosting units BU1 and BU2 are used in the second mode.

In the second mode of the charge pump circuit 12, the boost control circuit 13 provides the first input terminals of the NOR gates 22 and 23 with the boosted voltage control signal CT at a low level (e.g., ground voltage Vs). Thus, the NOR gates 22 and 23 generate the first clock signal CK1 and the second clock signal *CK1, the phase of which is reversed from that of the first clock signal CK1.

The second clock signal *CK1 is provided to the second terminal of the capacitor 21a and the gate of the transistor 20a. In this state, the voltage VE at node E oscillates between the power supply voltage VD and 2× the power supply voltage, i.e., 2VD in correspondence with the amplitude of the second clock signal *CK1. In the second mode, the first boosting unit is validated.

The transistors 20b and 20c and the capacitors 21b and 21c are provided with the same voltage and signal as those in the first mode. Thus, in accordance with the amplitude of the first clock signal CK1, the voltage VF at node F oscillates between 2× the power supply voltage VD and three times (3×) the power supply voltage 2VD. As a result, the boosted voltage VO1 is generated at 3× the power supply voltage, i.e., 3VD.

Figure 7:
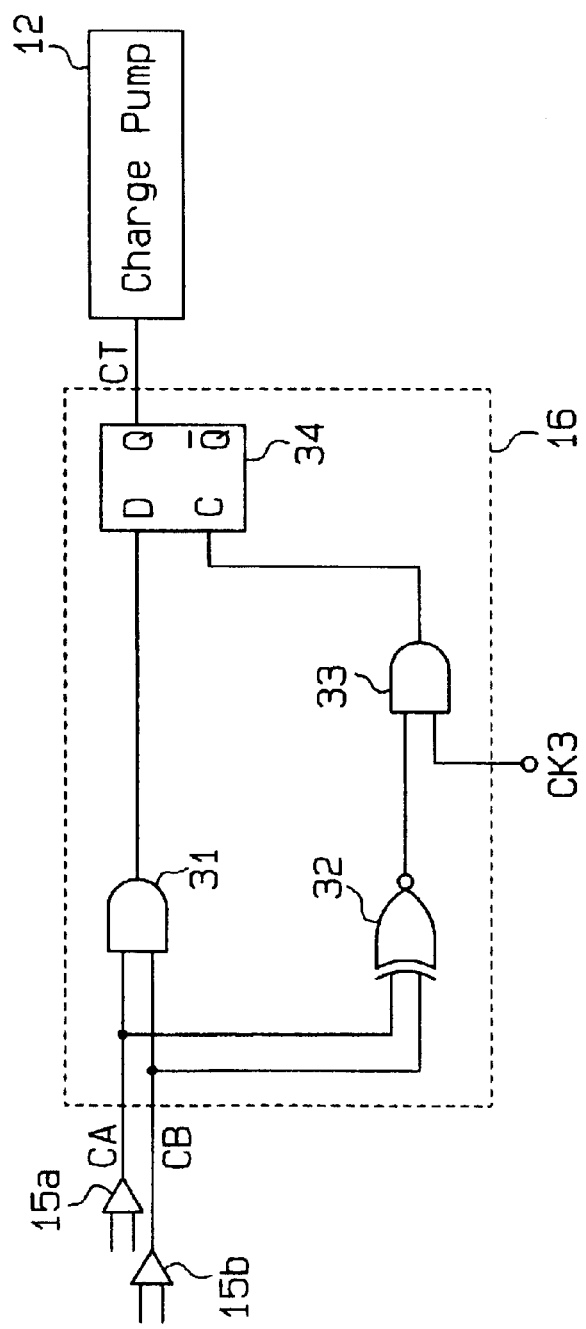
FIG. 7 is a schematic circuit diagram of a control unit in the booster of FIG. 2.

FIG. 7 is a schematic circuit diagram of the control unit 16, which is included in the boost control circuit 13. The control unit 16 includes a first AND gate 31, an EXNOR gate 32, a second AND gate 33, and a D-flip-flop 34.

The first AND gate 31 has a first input terminal, which receives the first comparison output CA, and a second input terminal CB, which receives the second comparison output CB. The first AND gate 31 generates a first AND operation signal in accordance with the first and second comparison outputs CA and CB. The EXNOR gate 32 has a first input terminal, which receives the first comparison output CA, and a second input terminal, which receives the second comparison output CB. The EXNOR gate 32 generates an exclusive OR operation signal of the first and second comparison outputs CA and CB.

The second AND gate 33 has a first input terminal, which is connected to the output terminal of the EXNOR gate 32, and a second input terminal, which receives a third clock signal CK3. The second AND gate 33 generates a second AND operation signal in accordance with the exclusive OR operation signal and the third clock signal CK3. The D-flip-flop 34 has a DATA input terminal D, which is connected to the output terminal of the first AND gate 31, and a clock terminal C, which is connected to the output terminal of the second AND gate 33. Non-inverted output terminal Q of the D-flip-flop 34 generates the boosted voltage control signal CT.

When the booster 11 is incorporated in the imaging device 10, the third clock signal CK3 shifts to the high level (e.g., power supply voltage VD) during the blanking period of at least one of a horizontal scanning period 1H and a vertical scanning period 1V.

The operation of the control unit 16 will now be discussed. When the second divisional voltage VB is greater than the reference voltage VR, the first AND gate 31 and the EXNOR gate 32 are provided with the first comparison output CA and the second comparison output at high levels. Thus, the first AND gate 31 and the second EXNOR gate 32 respectively generate the first AND operation signal and the exclusive OR operation signal at a high level and provide the high first AND operation signal and exclusive OR operation signal to the DATA input terminal D of the D-flip-flop 34 and the AND gate 33. In this state, the second AND gate 33 generates the second AND signal at the high level only when the third clock signal CK3 is high. As a result, the D-flip-flop 34 latches the high first AND operation signal during the blanking period of at least one of the horizontal scanning period 1H and the vertical scanning period 1V.

When the value of the first divisional voltage VA is less than that of the reference voltage VR, the first AND gate 31 and the EXNOR gate 32 are provided with the first comparison output CA and the second comparison output CB at low levels. Thus, the first AND gate 31 generates the first AND operation signal at a low level, and the EXNOR gate 32 generates the exclusive OR operation signal at a high level. As a result, the D-flip-flop 34 latches the low signal during the blanking period of at least one of the horizontal scanning period 1H and the vertical scanning period 1V.

When the value of the first divisional voltage VA is greater than that of the reference voltage VR and the second divisional voltage VB is less than the reference voltage VR, that is, when the reference voltage VR is between the two divisional voltages VA and VB, the EXNOR gate 32 receives the comparison outputs CA and CB at different logic levels. Thus, the EXNOR gate 32 generates the exclusive OR operation signal at a low level, and the second AND gate 33 generates the second AND operation signal at a low level. In this state, the D-flip-flop 34 does not re-latch the first AND operation signal. Thus, the logic level of the boosted voltage control signal CT does not change.

In the control unit 16, the logic level of the boosted voltage control signal CT is shifted only during the horizontal scanning period 1H or the vertical scanning period 1V of the imaging device 10. Thus, the boosting rate, or boosting capability, of the charge pump circuit 12 is guaranteed during the image signal output period. This prevents noise, which is produced when the boosting rate of the charge pump circuit 12 is changed, from mixing with image signals.

In the control unit 16, when the reference voltage VR is between the two divisional voltages VA and VB, the boosting capability of the charge pump circuit 12 does not change. Thus, even if the power supply voltage VD fluctuates within a minute range, the boosting capability of the charge pump circuit 12 is prevented from frequently changing.

It should be apparent to those skilled in the art that the present invention may be embodied in many other specific forms without departing from the spirit or scope of the invention. Particularly, it should be understood that the present invention may be embodied in the following forms.

The number of boosting units is not limited and may be any number, for example, three.

The boosted voltage VO1 may be a voltage that is boosted toward the negative side.

The present examples and embodiments are to be considered as illustrative and not restrictive, and the invention is not to be limited to the details given herein, but may be modified within the scope and equivalence of the appended claims.

What is claimed is:

1. A booster for receiving a power supply voltage and generating a boosted voltage, the booster comprising:
   a charge pump circuit including a plurality of boosting units connected in series and selectively validating the boosting units to generate the boosted voltage in accordance with the number of validated boosting units; and
   a boost control circuit connected to the charge pump circuit to determine whether the boosted voltage is in a predetermined range and change the number of validated boosting units in accordance with the determination, wherein the boost control circuit increases the number of boosting units when the boosted voltage is smaller than a first voltage and decreases the number of boosting units when the boosted voltage is greater than a second voltage, wherein the first voltage is smaller than the second voltage.

2. The booster according to claim 1, wherein the boost control circuit includes:
   a voltage dividing circuit connected to the charge pump circuit to divide the boosted voltage and generate a divisional voltage;
   a comparator connected to the voltage dividing circuit to compare the divisional voltage with a predetermined reference voltage; and
   a control unit connected to the comparator to change the number of the boosting units that are validated in accordance with the comparison of the comparator.

3. The booster according to claim 1, wherein each of the boosting units includes a switching device and a capacitor, the capacitor being connected to the switching device.

4. A booster for receiving a power supply voltage and generating a boosted voltage, the booster comprising
   a charge pump circuit including a plurality of boosting units connected in series and selectively validating the boosting units to generate the boosted voltage in accordance with the number of validated boosting units; and
   a boost control circuit connected to the change pump circuit to determine whether the boosted voltage is in a predetermined range and change the number of validated boosting units in accordance with the determination, wherein the boost control circuit includes:
   a voltage dividing circuit connected to the charge pump circuit to divide the boosted voltage and generate a first divisional voltage and a second divisional voltage, which is less than the first divisional voltage;

a comparator connected to the voltage dividing circuit to compare the first and second divisional voltages with a predetermined reference voltage; and a control unit connected to the comparator to change the number of boosting units that are validated in accordance with the comparison of the comparator, wherein the control unit invalidates at least one of the boosting units when the second divisional voltage is greater than the reference voltage, validates at least one of the invalidated boosting units when the first divisional voltage is less than the reference voltage, and maintains the number of presently validated boosting units when the reference voltage is between the first and second divisional voltages.

5. The booster according to claim 4, wherein the control unit invalidates the boosting unit that is closest to a power supply input when the second divisional voltage is greater than the reference voltage.

6. A method for controlling a charge pump circuit including a plurality of boosting units that are connected in series, wherein the boosting units are selectively validated to generate the boosted voltage in accordance with the number of validated boosting units, the method comprising:

generating a divisional voltage by dividing the boosted voltage;

determining whether the divisional voltage is in a predetermined range; and changing the number of boosting units that are validated in accordance with the determination, wherein said changing the number of boosting units includes increasing the number of boosting units when the boosted voltage is smaller than a first voltage and decreasing the number of boosting units when the boosted voltage is greater than a second voltage, wherein the first voltage is smaller than the second voltage.

7. The method according to claim 6, wherein:

said generating a divisional voltage includes generating a first divisional voltage and a second divisional voltage, which is less than the first divisional voltage;

said determining includes comparing the first and second divisional voltages with a predetermined reference voltage;

said changing includes:
invalidating at least one of the boosting units when the second divisional voltage is greater than the reference voltage;
validating at least one of the invalidated boosting units when the first divisional voltage is less than the reference voltage; and
maintaining the number of presently validated boosting units when the reference voltage is between the first and second divisional voltages.

8. A method for controlling a charge pump circuit including a plurality of boosting units that are connected in series, wherein the boosting units are selectively validated to generate the boosted voltage in accordance with the number of validated boosting units, the method comprising:

generating a divisional voltage by dividing the boosted voltage;

determiining whether the divisional voltage is in a predetermined range; and changing the number of boosting units that are validated in accordance with the determination, wherein the charge pump circuit is connected to a solid state imaging device that generates an image signal in synchronism with a vertical synchronizing signal and a horizontal synchronizing signal, wherein said changing includes changing the number of validated boosting units in the charge pump circuit during a blanking period of at least one of the vertical synchronizing signal and the horizontal synchronizing signal.

9. An imaging device comprising:

a solid state imaging device having a plurality of light receiving pixels for storing information charges;

a charge pump circuit including a plurality of boosting units connected in series for selectively validating the boosting units to generate a boosted voltage in accordance with the number of validated boosting units; and a boost control circuit connected to the charge pump circuit to determine whether the boosted voltage is in a predetermined range and change the number of validated boosting units in accordance with the determination;

a regulating circuit connected to the charge pump circuit to generate a predetermined adjusted voltage in accordance with the boosted voltage and a reference voltage; and a drive circuit connected to the regulating circuit to drive the solid state imaging device, wherein the drive circuit is operated in accordance with the adjusted voltage for driving the solid state imaging device to obtain an image signal from the information charges.

10. The imaging device according to claim 9, wherein the boost control circuit includes:
a voltage dividing circuit for dividing the boosted voltage and generating a first divisional voltage and a second divisional voltage, which is less than the first divisional voltage;

a comparator connected to the voltage dividing circuit to compare the first and second divisional voltages with a predetermined reference voltage; and a control unit connected to the comparator to change the number of boosting units that are validated in accordance with the comparison of the comparator, wherein the control unit invalidates at least one of the boosting units when the second divisional voltage is greater than the reference voltage, validates at least one of the invalidated boosting units when the first divisional voltage is less than the reference voltage, and maintains the number of presently validated boosting units when the reference voltage is between the first and second divisional voltages.

11. The imaging device according to claim 10, wherein each of the boosting units includes a switching device and a capacitor, the capacitor being connected to the switching device.

12. The imaging device according to claim 9, wherein the solid state imaging device generates the image signal in synchronism with a vertical synchronizing signal and a horizontal synchronizing signal, and the boost control circuit changes the number of validated boosting units in the charge pump circuit during a blanking period of at least one of the vertical synchronizing signal and the horizontal synchronizing signal.

* * * * *